(12) United States Patent
Liu

(10) Patent No.: US 12,415,587 B2
(45) Date of Patent: Sep. 16, 2025

(54) GRIP WITH ACCIDENT NOTIFICATION FUNCTIONS AND SYSTEM THEREOF

(71) Applicant: Zi-Ju Liu, Taoyuan (TW)

(72) Inventor: Zi-Ju Liu, Taoyuan (TW)

( * ) Notice: Subject to any disclaimer, the term of this patent is extended or adjusted under 35 U.S.C. 154(b) by 0 days.

(21) Appl. No.: 18/653,265

(22) Filed: May 2, 2024

(65) Prior Publication Data

US 2024/0367747 A1 Nov. 7, 2024

(30) Foreign Application Priority Data

May 5, 2023 (TW) .................................. 112116833

(51) Int. Cl.
*B62K 21/26* (2006.01)
*B60R 21/013* (2006.01)
*B60R 21/00* (2006.01)

(52) U.S. Cl.
CPC ............ *B62K 21/26* (2013.01); *B60R 21/013* (2013.01); *B60R 2021/0027* (2013.01)

(58) Field of Classification Search
None
See application file for complete search history.

(56) References Cited

U.S. PATENT DOCUMENTS

| | | | |
|---|---|---|---|
| 8,402,664 B1* | 3/2013 | Kitamura | B62K 23/04 33/1 PT |
| 2017/0080993 A1* | 3/2017 | Bierwerth | B62M 25/08 |
| 2018/0156631 A1* | 6/2018 | Huard | B62K 21/26 |

FOREIGN PATENT DOCUMENTS

CN 207697899 U * 8/2018

* cited by examiner

*Primary Examiner* — Vicky A Johnson
(74) *Attorney, Agent, or Firm* — Birch, Stewart, Kolasch & Birch, LLP

(57) ABSTRACT

A grip having accident notification functions and associated system are disclosed. The grip has portions of front, middle and rear. The front portion is overlaid on the handlebar surrounded with multiple component modules. The middle portion having multiple wiring slot. The rear portion has a radially disposed main circuit board and an axially disposed antenna. The main circuit board has an accident notification system and is electrically connected to the antenna. The accident notification system based on an anomaly determination rule, which sends out a notify signal to an external telecom terminal through the antenna, when an anomaly of the grip is determined. Therefore, the grip is able to achieve on emergency detection and notification by integrating the accident notification system and novel ways of deploying antenna into a such narrow space inside the grip.

13 Claims, 4 Drawing Sheets

GRIP WITH ACCIDENT NOTIFICATION FUNCTIONS AND SYSTEM THEREOF

RELATED APPLICATIONS

This application claims priority to Taiwan Application Serial Number 112116833, filed May 5, 2023, which are herein incorporated by reference.

FIELD OF INVENTION

The present disclosure relates to a grip and an accident notifying system, and more particularly to a grip that can automatically report the location of the accident and emergency contacts as the accident occurs.

DESCRIPTION OF RELATED ARTS

With the progress of communication technology development, many emergency notification systems have been developed with communication technologies such as GSM, narrowband internet of things (NB-IoT) and satellites. The system allows a person to make communications with mobile devices in outdoors or dangerous environments. The system can further real-time sent out locations and distress signals in several unexpected conditions such as an accident occurs.

However, such products are not easy to promote to the market, only few can be considered promising in business are integrated into electronic smart watch, mobile phone or electric vehicles. The main reason is that most products are solely designed and manufactured without the considerations of incorporating with third party devices in actual practice. Simply hanging or wearing such notification devices through external connecting mechanisms are often found stupid and silly.

Moreover, using two-wheel bicycle as examples, the notification device is commonly seen to be mounted on the handlebar, underneath the seat cushion, the down tube, the seat tube or even wore on human through external accessories known as non-standardized attachment or plug-in. Nevertheless, none of above-mentioned locations are good. Not only signals are too easy to have interference or be shielded, but there are also too many possibilities and reasons to make accident happened. Sensing unexpected conditions may not come from the bicycle or external impacts, and more is from the notification device itself. The non-standardized installation cannot fully reflect situations between the vehicle body and the user's actual operation, which results of the accurate of sensing accident being low.

Therefore, without affecting the accurate of sensing and the reliable communications, there's a need for accident notifications device, which are able to integrate software and hardware into the vehicles without using any external non-standardized attaching components.

SUMMARY OF THE PRESENT DISCLOSURE

According to an aspect of the present disclosure, a grip with accident notification function is provided. In one embodiment, a grip comprises a hollow tube, at least one antenna and a cover. The hollow tube has opening at respectively sides that communicates to each other, and sequentially comprises a front portion, a middle portion and a rear portion.

The front portion has multiple component slots formed on the surface of the front portion. Each component slot is configured to accommodate a component module. The middle portion has multiple wiring slots formed on the surface of the middle portion, and each wiring slot is communicating with the corresponding component slot. The rear portion has a protrusion protruded radially and inwardly along an inner wall of the rear portion that is configured for mounting a main circuit board and in which creates a first space and a second space within the rear portion. The second space communicates to the middle portion.

The antenna is placed and electrically connected to the main circuit board in inside the first space. The main circuit board has an accident notification system that sending a notify signal to an external telecom terminal via the antenna.

The cover overlays the hollow tube from the rear portion toward the front portion, and the handlebar is inserted from the opening corresponded to the front portion into the hollow tube.

According to another aspect of the present disclosure, an accident notification system which is placed inside a grip, and comprises a motion data retrieving module, a data monitoring module, a positioning module and a communicating module. The motion data retrieving module obtains a motion data of the grip at a sampling frequency. The data monitoring module continuously receives the motion data, and send out a warning signal when an anomaly is determined that based on an anomaly determination rule. The positioning module obtains a location data. The communicating module generates a notify signal and transmitting the notify signal to an external telecom terminal, which is according to the warning signal.

Accordingly, the grip is able to achieve on emergency detection and notification by integrating the accident notification system and novel ways of deploying antenna into a such limiting space inside the grip.

DETAILED DESCRIPTION

Figure 1:
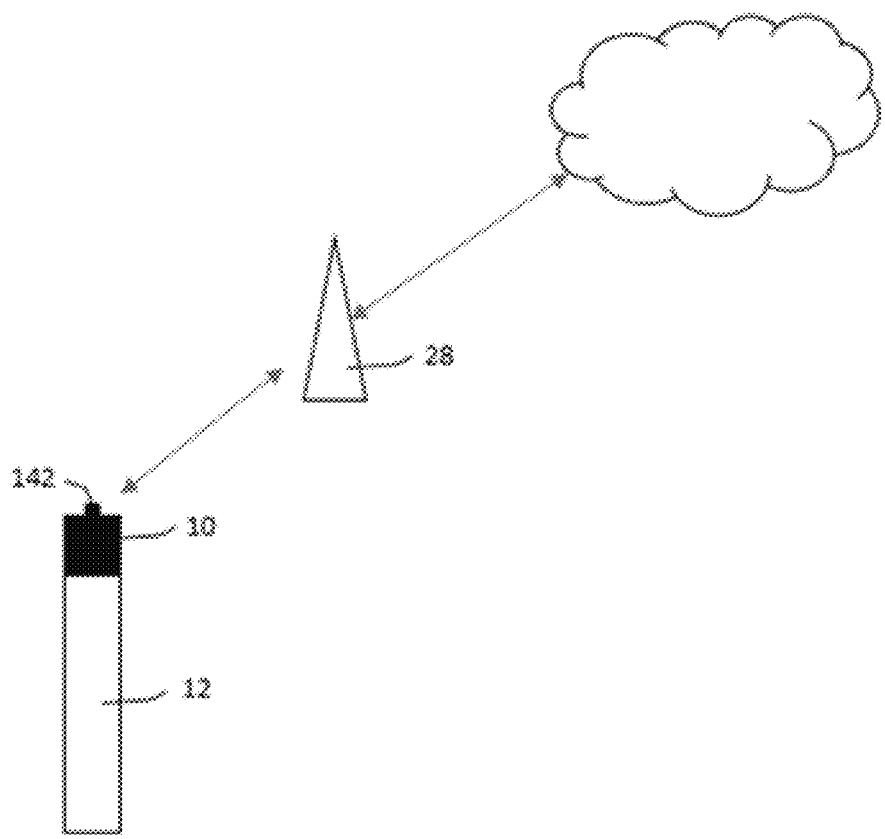
FIG. 1 is an exemplary diagram illustrating an accident notification system in accordance with an embodiment of the present disclosure.
Figure 2:
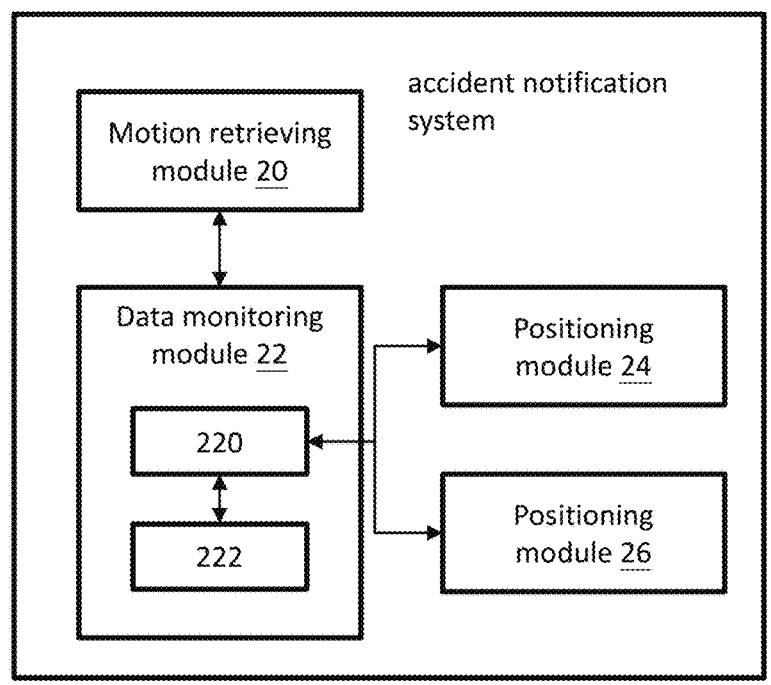
FIG. 2 is a functional block diagram in accordance with an embodiment of the present disclosure.

With reference to FIGS. 1 and 2, FIG. 1 is an exemplary diagram illustrating an accident notification system in accordance with an embodiment of the present disclosure; and FIG. 2 is a functional block diagram in accordance with an embodiment of the present disclosure. in one embodiment, an accident system is placed inside a grip 10. The grip 10 is connected to an end of a handlebar 12. The handlebar 12 maybe a pole or pestle such as sticker of mountain climbing.

The grip-type accident notification system comprises a motion data retrieving module 20, a data monitoring module 22, a positioning module 24 and a communicating module 26.

The motion data retrieving module 20 is used for obtaining a motion data of the grip 10 at a sampling frequency. In one embodiment, the motion data retrieving module 20 may be a six-axis motion sensor used to obtain acceleration components and angular velocity changes in the X, Y, and Z axes.

The data monitoring module 22 may be a micro control unit (MCU) 220 and is used for continuously receiving the motion data from the motion data retrieving module 20. The data monitor module 22 further comprises a storage unit 222. The storage unit 222 has a predetermined anomaly determination rule. The MCU 220 adjust the sampling frequency of the motion data retrieving module 20 based on the anomaly determination rule as to dynamically determine if an anomaly of the grip 10 occurs.

The positioning module 24 is used for obtaining a location data of the grip 10. The data monitoring module 22 generates a warning signal when an anomaly of the grip 10 is determined. The communicating module 26 is connected to the data monitoring module 22, receiving the warning and is used for generating a notify signal with the location data and transmitting the notify signal to an external telecom terminal 28.

The positioning module 24 mainly for identify the location information of a person who is using the grip 10, and it can be implemented in technologies including GSM, NB-IoT, WIFI, Bluetooth or GPS. The communicating module 26 can also uses technologies such as GSM, NB-IoT, WIFI or Bluetooth for sending the notify signal to the external telecom terminal 28. Therefore, the positioning module 24 and the communicating module 26 of the present disclosure are not distinguished and defined by devices, but by functional means.

The telecom terminal 28 can be considered as a recipient for receiving the notify signal, which is not limited to a single signal station, which forming a cloud platform of internet connections. In one embodiment, the notify signal further includes an identification code. The telecom terminal 28 has an emergency contact information corresponded to the identification code. When telecom terminal 28 received the notify signal, it can notify through the corresponding emergency contact information. The emergency contact information can be multiple, including not only the contact person set by the user, but also the police station, fire department, and even diplomatic agency in the corresponding base station area.

The identification code has a media access control (MAC) address, each MAC address is unique that can be used as a verification of the owner of the grip 10. It serves as an identity registration of reporting accidents. Therefore, if the grip 10 is stolen, the function of accident notification can be limited and further achieve anti-theft effects.

Figure 3:
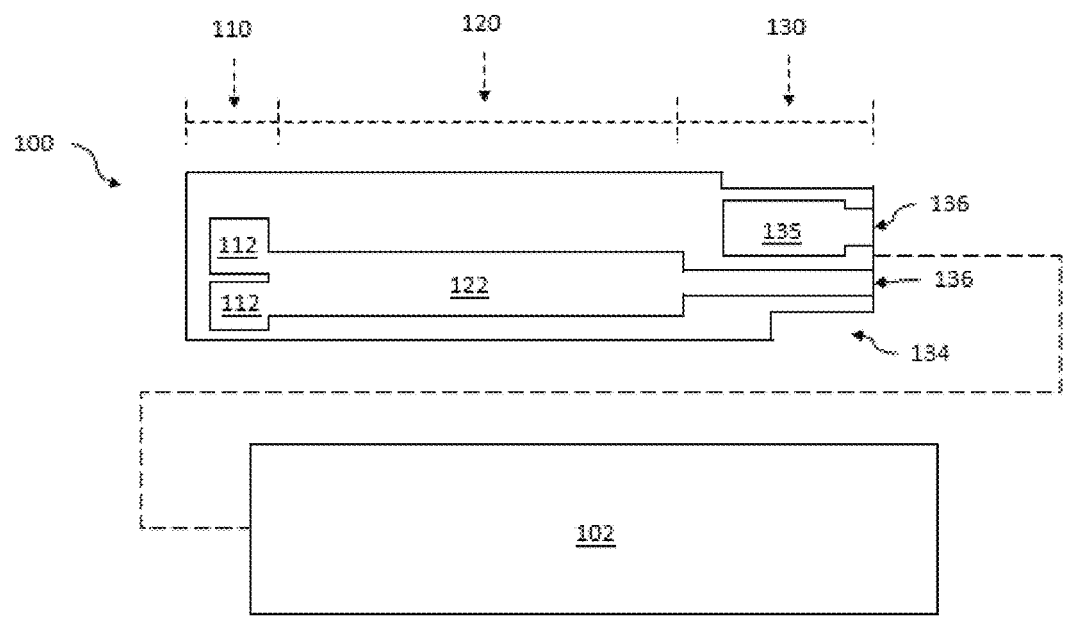
FIG. 3 is an exemplary diagram illustrating a grip with accident notification functions in accordance with an embodiment of the present disclosure.
Figure 4:
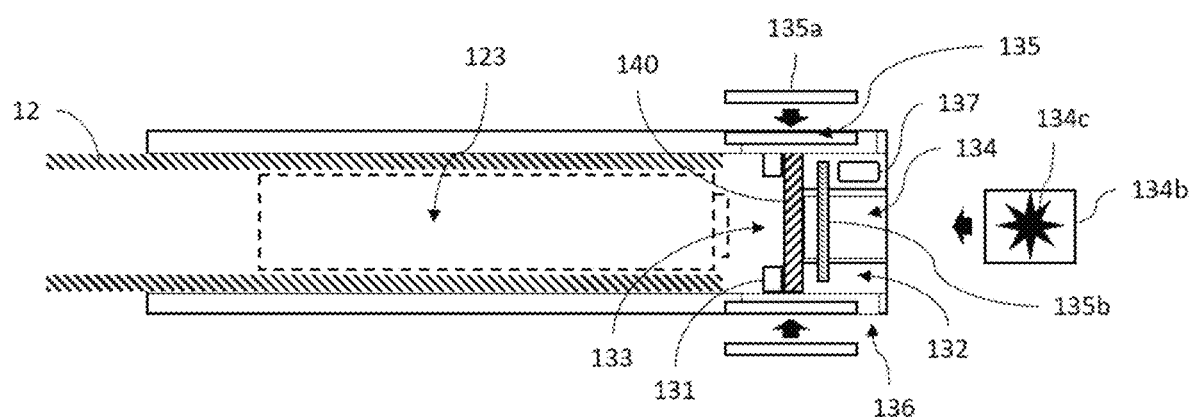
FIG. 4 is a section view of the hollow tube of FIG. 3.

With further reference to FIGS. 3 and 4, FIG. 3 is an exemplary diagram illustrating a grip with accident notification functions in accordance with an embodiment of the present disclosure; and FIG. 4 is a section view of the hollow tube of FIG. 3. In this embodiment, the grip 10 has a hollow tube 100 and a cover 102. The hollow tube 100 has opening at respectively sides communicated to each other, and sequentially has a front portion 110, a middle portion 120 and a rear portion 130. The handlebar 12 is inserted from the opening corresponded to the front portion 110 into the hollow tube 100, which the end of the handlebar 12 is penetrated against inside the middle portion 120. The cover 102 overlays the hollow tube 100 to form the grip 10.

The surface of the front portion 110 forms multiple component slots 112 and each component slot 112 is used for accommodating a component module (not shown). The surface of the middle portion 120 has formed multiple wiring slots 122, and each wiring slot 122 is communicating with the corresponding component slot 112. The number of the wiring slots 122 is fewer than the number of the component slots 112. In other words, multiple component slots 112 can share with a wiring slot 122. In side the middle portion 120 has an inner accommodation 123 which may place a battery as a power source. However, if the grip 10 can be powered by the control system of the bicycle itself, the battery can be used as a backup battery. The inner accommodation 123 does not necessarily used to receive the battery, other electronic component can be also applicable which extends its flexibility of the space. To avoid excessive complexity in schematic drawing, the drawing of signal or power lines used for electrical conductivity will be omitted. This part does not affect the implementation of the present invention by those skilled in the art.

As shown in FIG. 4, the contour of the inner wall of the rear portion 130 further comprises a protrusion 131 radially and inwardly protruded, which is used for holding a main circuit board 140. The main circuit board 140 may electrically connect to the battery and makes the inner space of the rear portion 130 being defined with a first space 132 and a second space 133. The outer wall of the rear portion 130 corresponded to the first space 132 have a pair of opposite windows 134 and antenna slots 135, multiple notches 136 and a receptacle slot 137. Each window 134 corresponded to the main circuit board 140 has an auxiliary circuit board 134*b* that being axially placed. The second space 133 communicates to the middle portion 120.

The auxiliary circuit board 134*b* can have different functional components 134*c* or combination of function components 134*c* according to actual application. For example, the function component 134*c* may be a light emitting unit, a radiofrequency unit or an antenna unit. In one embodiment, the function component 134*c* is a LED light, the LED light is installed on the auxiliary circuit board 134*b* facing outside the window 134 and the light is radially emitted outside the hollow tube 100 through the transparent portion of the window 134.

The antenna slot 135 is used for receiving a first antenna 135*a*. The notches 136 is which are corresponding formed to allow the inner space of the rear portion 130 being communicates to the antenna slot 135 and the wiring slot 122. The component module inside the component slot 112 and the first antenna 135*a* of the antenna slot 135 can selectively being electrically connected via wire to the main circuit board 140 or the auxiliary circuit board 134*b*. The receptacle slot 137 receives a data communication interface electrically connected to the main circuit board 140. A person can charge the battery through the receptacle slot 137, and/or access data stored inside the main circuit board 140 or the auxiliary circuit board 134*b*. However, when the grip 10 is powered by the electric control system of the bicycle itself, the grip 10 may become a DC hub that discharge externally through the receptacle slot 137. Moreover, even if the grip 10 is equipped with a battery and powered by the electric control system of the bicycle as independent power source, the main circuit board 140 may switch the power source according to the discharging target.

In one embodiment, the main circuit board 140 is a double-side printed circuit board having a first surface 140*a* and a second surface 140b. The first surface 140a corresponds to the first space 132, and the second surface 140b corresponds to the second space 133. On the first side 140a, a second antenna 135b can be arranged in parallel. The positioning module 24 and the communicating module 26 are respectively electrically connected to the first antenna 135a or the second antenna 135b through the antenna connection seat 141 set on the first side 140a. it is worth noting that due to the limited space inside the grip 10. Since the first antenna 135a and the second antenna 135b are located in the radial and axial directions of the grip sleeve 10, a high angle range of radio frequency above 270 degrees can be achieved. In addition, the inner accommodation 123 is communicated with the second space 133, the battery or the electronic component provided in the inner accommodation 123 is electrically connected to the second side 140b of the main circuit board 140.

The motion data retrieving module 20 and the data monitoring module 22 can be selectively mounted on either the first side 140a or the second side 140b of the main circuit board 140. These two modules do not have high requirements for the shelter clearance. Accordingly, such configuration and arrangement has achieved the highest space utilization, communication efficiency and signal reception effects.

Furthermore, with reference to FIGS. 1 and 4, when the grip 10 is used in the applications of mountain climbing or associated poles, the grip 10 may further comprise an emergency button 142 electrically connected to the first surface 140a of the main circuit board 140. The electronic component inside the component slot 112 can be a headlight module and a buzzer respectively. When a person encounters emergency or accident, the emergency button 142 can be triggered to transmit the notify signal. The headlight module and the buzzer simultaneously turned on for assistance, so that nearby people or search teams can hear the sound or see the light to increase success rescue time.

Figure 5:
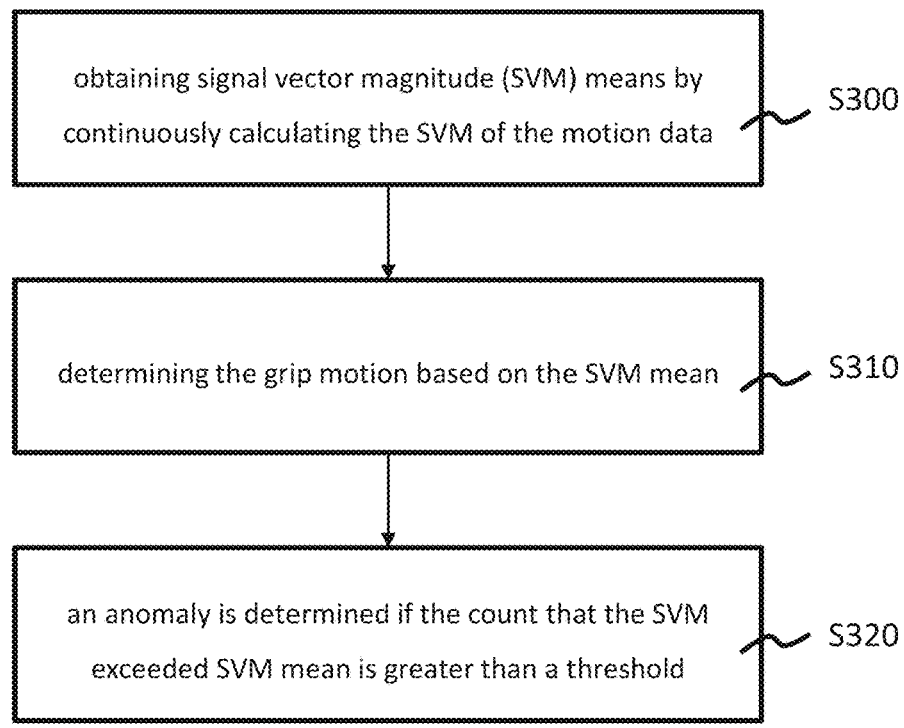
FIG. 5 is a flowchart of an anomaly determination rule in accordance with an embodiment of the present disclosure.

With reference to FIG. 5, FIG. 5 is a flowchart of an anomaly determination rule in accordance with an embodiment of the present disclosure. The anomaly determination rule for determining the anomaly of the grip comprises acts of S300 obtaining signal vector magnitude (SVM) means by continuously calculating the SVM of the motion data; S310 determining the grip motion based on the SVM mean; and S320 an anomaly is determined if the count that the SVM exceeded SVM mean is greater than a threshold. In one embodiment, the vector intensity of the motion sensor is different for a person holding mountain climbing poles in uphill, downhill and walking on a flat road. In general, the SVM mean for walking on a flat will be the lowest, while the SVM in the movement of downhill is the highest. Bias in addition for the flatness of the road and health conditions for each individual. In order to improved the accuracy and reduce the probability of misjudgment, sampling frequency of retrieving will change according to different grip motion which is determined based on the SVM mean. In some embodiment, the sampling frequency is linear related to the SVM mean.

|  | Uphill | Flat | Downhill |
|---|---|---|---|
| SVM mean | >0.35 g | <0.03 g | >0.9 g |
| Sampling frequency | 80 Hz | 60 Hz | 120 Hz |

Above table is an example shows the relationship between the sampling frequencies and SVM means. When the sampling frequency is increasing from 60 Hz to 80 Hz or even 120 Hz, in the same period of time, the SVM value should be lower than the SVM means unless an accident occurs. For example, when a person is downhill, the threshold is set to 15. If the SVM of 15 consecutive sampling points is greater than 0.9 g, the data monitoring module 22 will determine the grip motion is abnormal. A warning signal will be generated. The setting of the threshold value can be adjusted according to different applications. Lower threshold value will increase sensitivity, while the over sensitivity may cause system misjudgment.

The present disclosure integrates the values of the acceleration and angle in the X, Y and Z directions of the grip. Utilizing the degree of intense changes in grip as basis, the method for determining accident is dynamically adjusting the sampling frequency of retrieving SVM in which successfully reduces the probability of misjudgment. As for the calculation of SVM value, it is well-known to those skilled in the field and will not be elaborated upon here.

Figure 6:
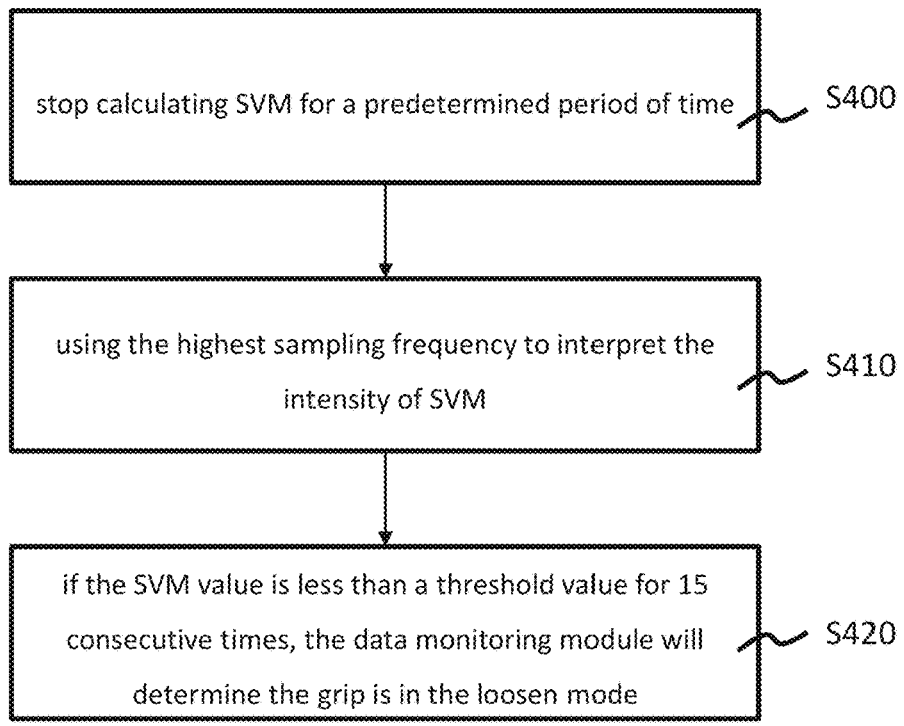
FIG. 6 is a flowchart of an anomaly determination rule in accordance with another embodiment of the present disclosure.

With reference to FIG. 6, FIG. 6 is a flowchart of an anomaly determination rule in accordance with another embodiment of the present disclosure. In this embodiment, the anomaly determination rule further comprises a loosen mode. Unlikely other conventional notification system, the unique feature of the grip type accident notification system is that in the event of an accident such as falling into a valley, the mountain climbing poles may be thrown out. The movement of the grip may be in situations of losing gravity or rolling causing chaotic SVM readings. However, the movement of the grip will eventually stop. Therefore, after the data monitoring module 22 sent out a first warning signal, the anomaly determination rule of determining the loosen mode comprising act of S400 stop calculating SVM for a predetermined period of time (e.g., 1 minute) and then S410 using the highest sampling frequency (e.g., 180 Hz) to interpret the intensity of SVM; and S420 if the SVM value is less than 0.03 g of a threshold value (ideally 0 g) for 15 consecutive times, the data monitoring module will determine the grip is in the loosen mode and consider the grip has left the person and in a static state. At this time, the system will issue another warning signal.

Figure 7:
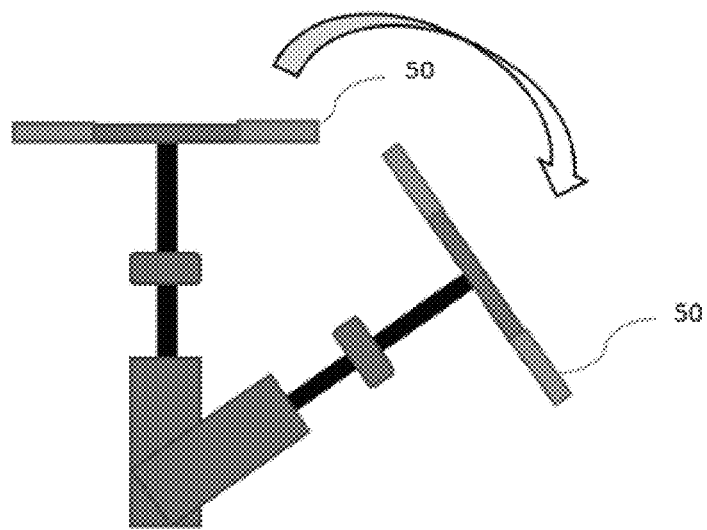
FIG. 7 is an exemplary diagram illustrated a grip used on a handlebar of a bicycle in accordance with an embodiment of the present disclosure.
Figure 8:
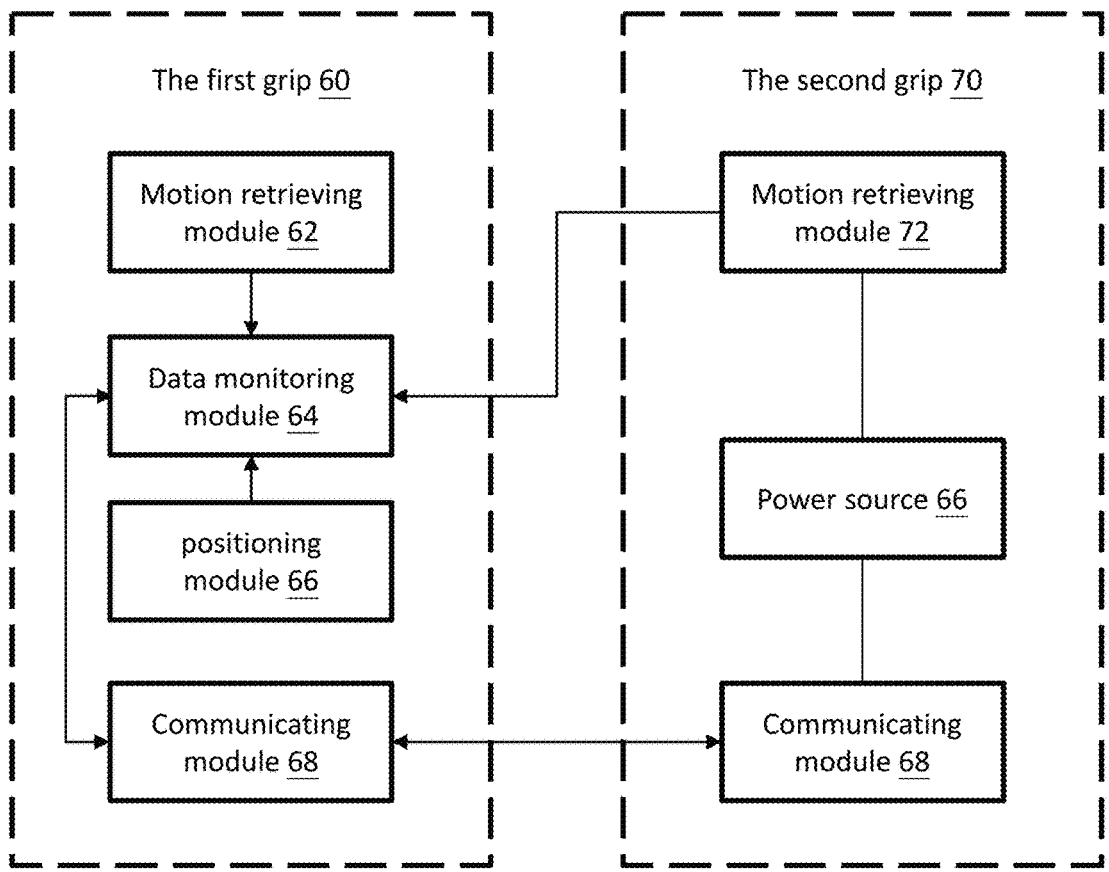
FIG. 8 is a block diagram illustrated an accident notification system adapted for the grip of FIG. 7.

With reference to FIGS. 7 and 8, FIG. 7 is an exemplary diagram illustrated a grip used on a handlebar of a bicycle in accordance with an embodiment of the present disclosure; FIG. 8 is a block diagram illustrated an accident notification system adapted for the grip of FIG. 7. In this embodiment, two grips are mounted on respectively ends of the handlebar forming a left handle and a right handle. The two grips may work independently or corporate with each other. For example, the data monitoring module is placed in a grip, and the positioning module and communicating module are placed in another grip. Two grips can communicate with each other in wire or wireless.

As shown in FIG. 8, the left handle is the first grip 60 and the right handle is the second grip 70. The first grip 60 has a motion retrieving module 62, a data monitoring module 64, a positioning module 66 and a communicating module 68. The second grip 70 has a motion retrieving module 72, a communicating module 74 and a power source 76. The data monitoring module 64 is the main controller of the accident notification system, and receives the data collected from the motion retrieving modules 62, 72. The positioning module 66 is a GPS module. The communicating module 66 has functions of NB-IoT and Bluetooth. The communicating module 74 has functions of GSM and Bluetooth. The communications between the communicating module 66 and the communicating module 74 are using Bluetooth. The power source 76 provides power to all abovementioned modules, and may be a lithium-ion battery.

Assuming that when a bicycle overturns and falls to the right, the motion retrieving module 72 of the second grip 70 will firstly sense severe collisions including frictions and rebounds with the ground, which is the fastest module detecting such sudden accident. As above described, the learning and analysis of SVM vectors can enable users to more accurately understand the situations they may encounter in application scenarios, accident scenarios, and even model predictions to reflect the situations of both cane users and cyclists. This enables the system to more accurately and accurately report the current situation of users, enabling more effective understanding and assistance from external rescue units, rather than wasting meaningless resources or missing the golden rescue time.

Accordingly, an accident notification system involves not only the design and integration of device mechanisms, layout planning and component settings, hardware and firmware parameter values, and software systems into a very space limited grip, but also the adaptation of the actual use of the grip and the effective antenna layout, thereby achieving more accurate emergency detection and effective notification.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A grip comprising:
    a hollow tube having opening at respectively sides that communicates to each other, and sequentially comprising:
        a front portion having multiple component slots formed on the surface of the front portion, wherein each component slot is configured to accommodate a component module;
        a middle portion having multiple wiring slots formed on the surface of the middle portion, wherein each wiring slot is communicating with the corresponding component slot; and
        a rear portion having a protrusion protruded radially and inwardly along an inner wall of the rear portion that is configured for mounting a main circuit board and in which creates a first space and a second space within the rear portion, wherein the second space communicates to the middle portion;
    at least one antenna being placed and electrically connecting to the main circuit board in inside the first space, wherein the main circuit board has an accident notification system that sending a notify signal to an external telecom terminal via the antenna; and
    a cover overlaying the hollow tube from the rear portion toward the front portion, wherein the handlebar is inserted from the opening corresponded to the front portion into the hollow tube.

2. The grip as claimed in claim 1, wherein the hollow tube further comprises at least one antenna slot formed on the outer wall of the rear portion and corresponded to the first space which allows a first antenna being axially placed inside the antenna slot, and being electrically connected to the main circuit board.

3. The grip as claimed in claim 2, further comprising a second antenna being mounted inside the first space and being paralleled to the main circuit board.

4. The grip as claimed in claim 2, wherein the rear portion further comprises multiple notches which are corresponding formed to allow the inner space of the rear portion being communicates to the antenna slot and the wiring slot.

5. The grip as claimed in claim 4, wherein:
    the rear end of the handlebar is penetrated against inside the middle portion, which creates an inner accommodation in a place corresponded to the middle portion, wherein the inner accommodation is configured for receiving a power source or an electronic component which electrically connects to the main circuit board; and
    the outer wall of the rear portion corresponding to the first space has a receptacle slot, and the receptacle slot receives a data communication interface for charging the power source or accessing data from the main circuit board.

6. The grip as claimed in claim 4, wherein the main circuit board has a motion data retrieving module, a data monitoring module, a positioning module and a communicating module, wherein the positioning module and the communicating module are disposed at the first surface of the main circuit board, and the motion data retrieving module and the data monitoring module are selectively disposed at the second surface.

7. The grip as claimed in claim 4, wherein the outer wall of the rear portion RF components corresponding to the first space has a receptacle slot, and the receptacle slot receives a data communication interface that is electrically connected to the main circuit board.

8. The grip as claimed in claim 1, wherein the rear portion corresponding to the first space has at least one window, the window allows an auxiliary circuit board to be axially placed, the auxiliary circuit board is electrically connected to the main circuit board, and has at least one functional component, wherein the function component is a light emitting unit, a radiofrequency unit and an antenna unit.

9. The grip as claimed in claim 1, further comprising:
    an emergency button being disposed corresponded to the rear portion, wherein the emergency button is configured for triggering the transmission of the notify signal and selectively driving the component module insides the component slots.

10. The grip as claimed in claim 9, wherein the component module is a headlight module and a buzzer.

11. An accident notification system placed inside a grip, the accident notification system comprising:
    a motion data retrieving module configured for obtaining a motion data of the grip at a sampling frequency;
    a data monitoring module configured for continuously receiving the motion data, and sending out a warning signal when an anomaly being determined that based on an anomaly determination rule;
    a positioning module configured for obtaining a location data; and
    a communicating module configured for generating a notify signal and transmitting the notify signal to an external telecom terminal, which is according to the warning signal.

12. The accident notification system as claimed in claim 11, wherein the notify signal has an identification code, and the telecom terminal has an emergency contact information corresponded to the identification code.

13. The accident notification system as claimed in claim 11, wherein the anomaly determination rule comprises an impact mode and a loosen mode.

\* \* \* \* \*